(12) United States Patent
Blount et al.

(10) Patent No.: US 7,976,628 B2
(45) Date of Patent: Jul. 12, 2011

(54) CARBON DIOXIDE CAPTURE FROM A CEMENT MANUFACTURING PROCESS

(75) Inventors: Gerald C. Blount, North Augusta, SC (US); Ronald W. Falta, Seneca, SC (US); Alvin A. Siddall, Aiken, SC (US)

(73) Assignees: Savannah River Nuclear Solutions, LLC, Aiken, SC (US); Clemson University, Clemson, SC (US)

( * ) Notice: Subject to any disclaimer, the term of this patent is extended or adjusted under 35 U.S.C. 154(b) by 252 days.

(21) Appl. No.: 12/456,613

(22) Filed: Jun. 19, 2009

(65) Prior Publication Data

US 2010/0319586 A1    Dec. 23, 2010

(51) Int. Cl.
*C04B 7/36* (2006.01)

(52) U.S. Cl. .......... 106/739; 106/737; 106/744; 60/274

(58) Field of Classification Search ................ 106/600, 106/800
See application file for complete search history.

(56) References Cited

U.S. PATENT DOCUMENTS

| | | | |
|---|---|---|---|
| 4,004,938 A | 1/1977 | Rohrbach et al. | |
| 5,156,676 A | 10/1992 | Garrett et al. | |
| 6,749,681 B1 | 6/2004 | Burdis et al. | |
| 2003/0000427 A1 | 1/2003 | Phillips | |
| 2009/0255444 A1* | 10/2009 | Martinez Vera | 106/744 |

FOREIGN PATENT DOCUMENTS

WO   WO 2008/059378 A2   5/2008

* cited by examiner

*Primary Examiner* — Jerry Lorengo
*Assistant Examiner* — Karam Hijji
(74) *Attorney, Agent, or Firm* — J. Bennett Mullinax, LLC

(57) ABSTRACT

A process of manufacturing cement clinker is provided in which a clean supply of $CO_2$ gas may be captured. The process also involves using an open loop conversion of CaO/MgO from a calciner to capture $CO_2$ from combustion flue gases thereby forming $CaCO_3/CaMg(CO_3)_2$. The $CaCO_3/CaMg(CO_3)_2$ is then returned to the calciner where $CO_2$ gas is evolved. The evolved $CO_2$ gas, along with other evolved $CO_2$ gases from the calciner are removed from the calciner. The reactants (CaO/MgO) are feed to a high temperature calciner for control of the clinker production composition.

4 Claims, 3 Drawing Sheets

CARBON DIOXIDE CAPTURE FROM A CEMENT MANUFACTURING PROCESS

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention relates to: 1) separations of carbon dioxide ($CO_2$) during the manufacture of cement; and 2) the use of calcium and magnesium oxide (CaO and MgO) present in the process as a reactant for capturing $CO_2$ from fuel combustion gases in an open loop system. The process further provides for enhanced levels of hydrating belite, and alite in the end cement product which enhances early and late cure strengths.

BACKGROUND OF THE INVENTION

In a cement manufacturing process, it is well known to combine a calcareous material such as limestone/dolomite ($CaCO_3/CaMg(CO_3)_2$) which is calcined with an argillaceous material such as shale/clay, silica, alumina, iron oxide, and similar materials. When heated to a temperature of approximately 1400° C., chemical reactions occur to convert the ingredients to calcium silicates, i.e., cement clinker. The clinker is subsequently milled to cement.

One typical commercial process for conventional cement manufacturing involves calcining and clinkering of cement raw materials by passing a mixture of finely divided raw material through a rotating inclined rotary vessel such as a conventional long wet or dry rotary kiln. In this process, the requisite temperatures are achieved by burning fuel such as gas, fuel oil, powdered coal, coke, and the like, singularly or in combinations in the gaseous atmosphere of the kiln with the gases moving counter current to the solids through the kiln. Given the high temperatures required for the process, fuel costs constitute a significant factor in the ultimate cost of the product. One of the more significant factors in a raw fuel costs for the production of cement clinker is the highly endothermic calcining step of converting calcium and magnesium carbonate to calcium and magnesium oxide (CaO and MgO) with the co-generation of carbon dioxide ($CO_2$). By some calculations, this step alone accounts for more than 70% of the energy requirement of a typical dry clinkering process.

Other approaches in the art to address carbon dioxide emission from a cement production facility have included separation steps of isolating carbon dioxide produced by combustion and calcination as set forth in the WIPO publication WO 2008/059378 A2 entitled, "Process For The Production Of Cement", and which is incorporated herein by reference.

While the art recognizes that $CO_2$ production and capture from a cement manufacturing process are problems that need to be addressed, there remains room for improvement and variation within the art.

SUMMARY OF THE INVENTION

It is one aspect of at least one of the present embodiments to provide for a cement making process in which the calcinate (limestone and dolomite) materials are separated from other raw materials prior to calcination.

It is yet another aspect of at least one of the present embodiments to undertake a low temperature calcining of carbonates to release $CO_2$ gases and to form CaO and MgO in a separate calciner with an atmosphere not in contact with combustion gases.

It is yet another aspect of at least one of the present embodiments to provide for a cement making process in which the calcined carbonates CaO and MgO are combined with other raw materials just prior to high temperature calcining to form clinker.

It is yet another aspect of at least one of the present embodiments to provide for a cement making process in which the calcined carbonates CaO and MgO are used to capture $CO_2$ from combustion exhaust gases to form carbonates ($CaCO_3$ and $CaMgCO_3$) in an open loop system that again calcines the carbonates to separate the $CO_2$.

It is yet another aspect of at least one embodiment of the present invention to control the addition points for carbonate oxides (CaO/MgO) in order to obtain increased yields of hydrating belite and alite, the addition points within a process further allowing a control of the ratio of belite to alite in the final product. Such controls allow cement manufacturers to control early and late hydration strength, minimize the presence of non-hydrating phases in a final product, and allow for higher beta-belite in the final product thereby increasing late cure strength and allowing lower formation temperatures to be used in the cement manufacturing process.

It is yet another aspect of at least one embodiment of the present invention to provide a process for the production of cement clinker which comprises the steps of: heating the limestone/dolomite components of the clinker feed in a first calciner at a temperature of between about 650° C. to about 1050° C., the calciner containing no combustion gases; removing a portion of a CaO/MgO reaction product from the calciner; using the removed CaO/MgO to capture $CO_2$ from fuel combustion flue gas associated with the cement production process, thereby generating a supply of $CaCO_3/CaMg(CO_3)_2$; introducing the supply of $CaCO_3/CaMg(CO_3)_2$ from the flue gas environment into the first calciner, the $CaCO_3/CaMg(CO_3)_2$ thereby releasing $CO_2$; removing released $CO_2$ from the calciner; and, removing additional reaction products from the calciner and subsequently exposing the reaction products in a second calciner to a temperature of at least between about 1300° C. to about 1450° C. until clinker is formed.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

As set forth in the Figures, a process of cement manufacturing is described in which carbon dioxide ($CO_2$) is separated and captured from the limestone/dolomite calcination process. The process also involves the use of oxide ($CaO/MgO$) generated in the calcination process as a $CO_2$ capture medium for fuel combustion gases laden with $CO_2$ in an open loop system.

Figure 1:
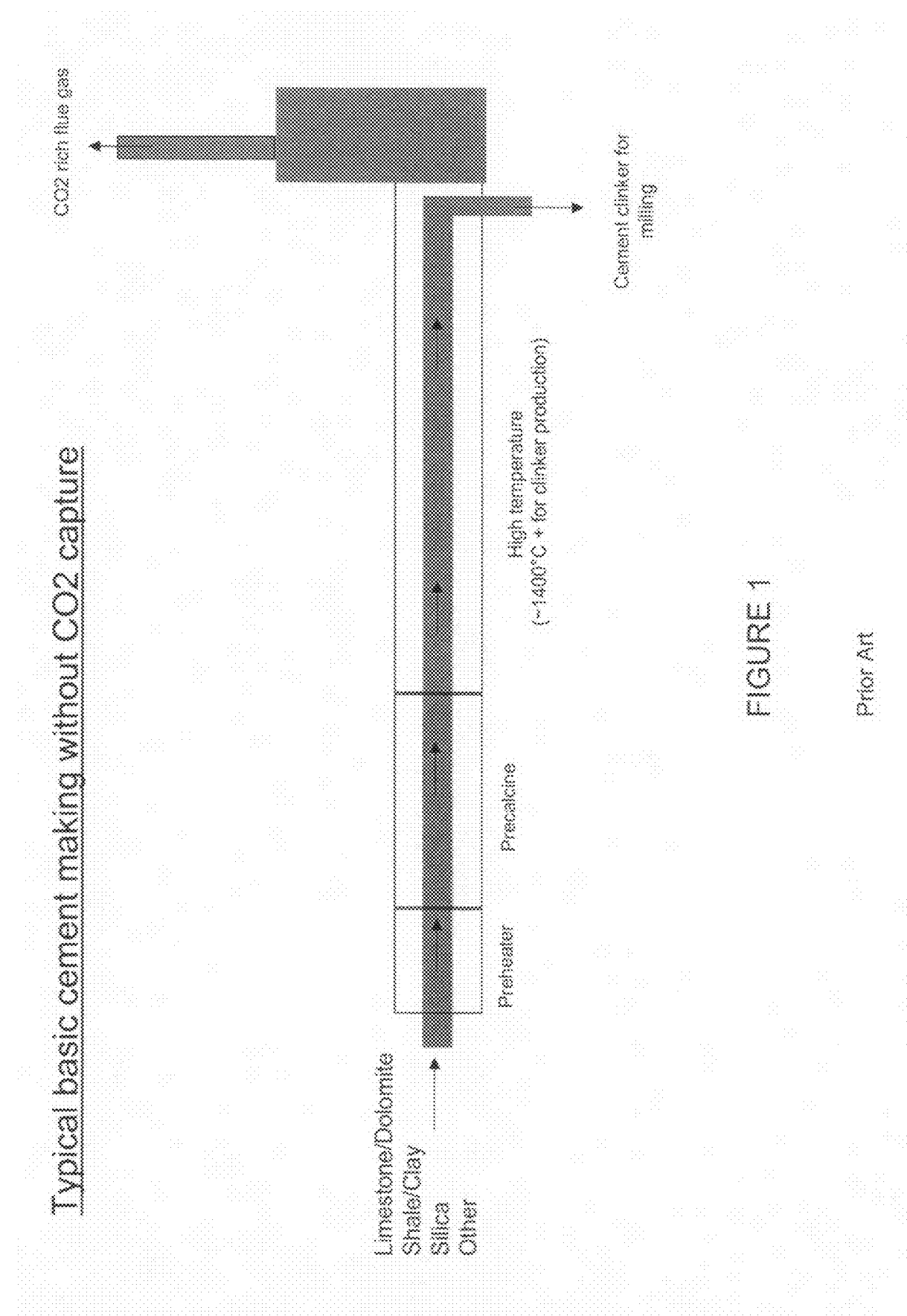
FIG. 1 is a schematic view of a prior art cement making process.

As seen in reference to FIG. 1 and as described in the background section of this application, a typical cement manufacturing process uses limestone/dolomite which is calcined with shale/clay, silica, and other minor components, to a sintering temperature of approximately 1400° C. and above to make clinker. The clinker is subsequently milled to cement. The chemical reactions utilized during the process steps of heating the clinker composite materials to a sintering temperature are well known. These steps include but are not limited to the following:

between 70 to 100° C. free water is evaporated;
between 400 to 600° C. clay materials are decomposed to their constituent oxides such as $SiO_2$ and $Al_2O_3$: dolomite ($CaMg(CO_3)_2$) decomposes to CaO, MgO, and $CO_2$;
between 650 to 900° C. calcium carbonate and magnesium carbonate decompose to CaO and MgO, respectively, with a loss of $CO_2$; the CaO further reacts with $SiO_3$ to begin forming primarily hydrating belite ($Ca_2SiO_4$);
between 900 to 1050° C. the remaining $CaCO_3/CaMg(CO_3)_2$ decomposes to $CaO/MgO$ and $CO_2$;
at temperatures greater 1050° C. hydrating belite is rapidly formed;
between 1300 to 1450° C. partial melting (20% to 30%) of materials occurs, and above 1400° C. belite reacts with CaO to rapidly form alite ($Ca_3SiO_5$).

A typical clinker composition typically consists of approximately 65% alite, 15% belite, 8% ferrite, and 7% aluminate with the residual components consisting of various alkali. Alite is responsible for the early strength properties in the hydration of cement while belite is responsible for late strength properties. A low temperature form of gamma-belite, also known as lime olivine, does not hydrate and the formation of gamma-belite is avoided since it reduces the strength of the resulting cement. It is known that the gamma-belite and lower temperature forms of belite will form by the reaction of CaO and MgO at temperatures as low as 300° C.

Figure 2:
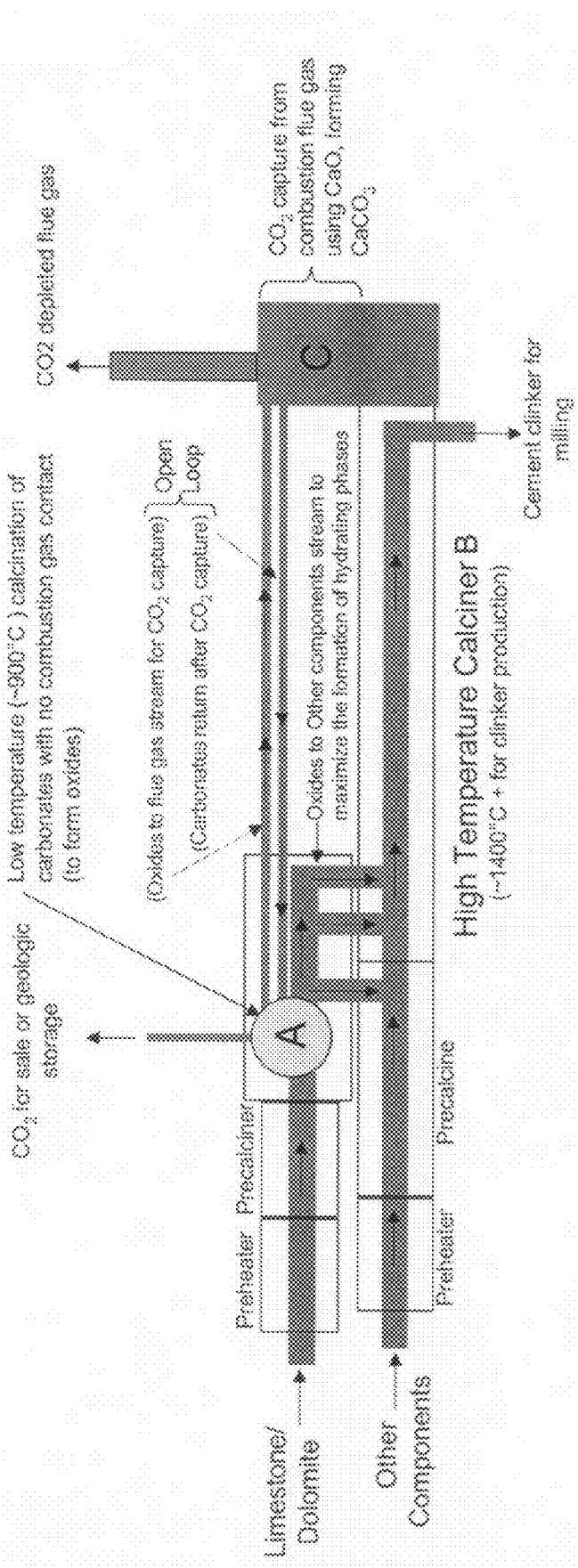
FIG. 2 is a schematic view of an embodiment of the invention showing $CO_2$ separation and capture via separate carbonate and alumina feeds.

As seen in reference to FIG. 2, in accordance with this invention it has been found that the cement kiln feed is broken into a separate limestone/dolomite feed with a separate shale/clay feed prior to calcination and it is possible to adjust the addition points of CaO/MgO and thereby favorably alter the cement chemistry of the final product.

Figure 3:
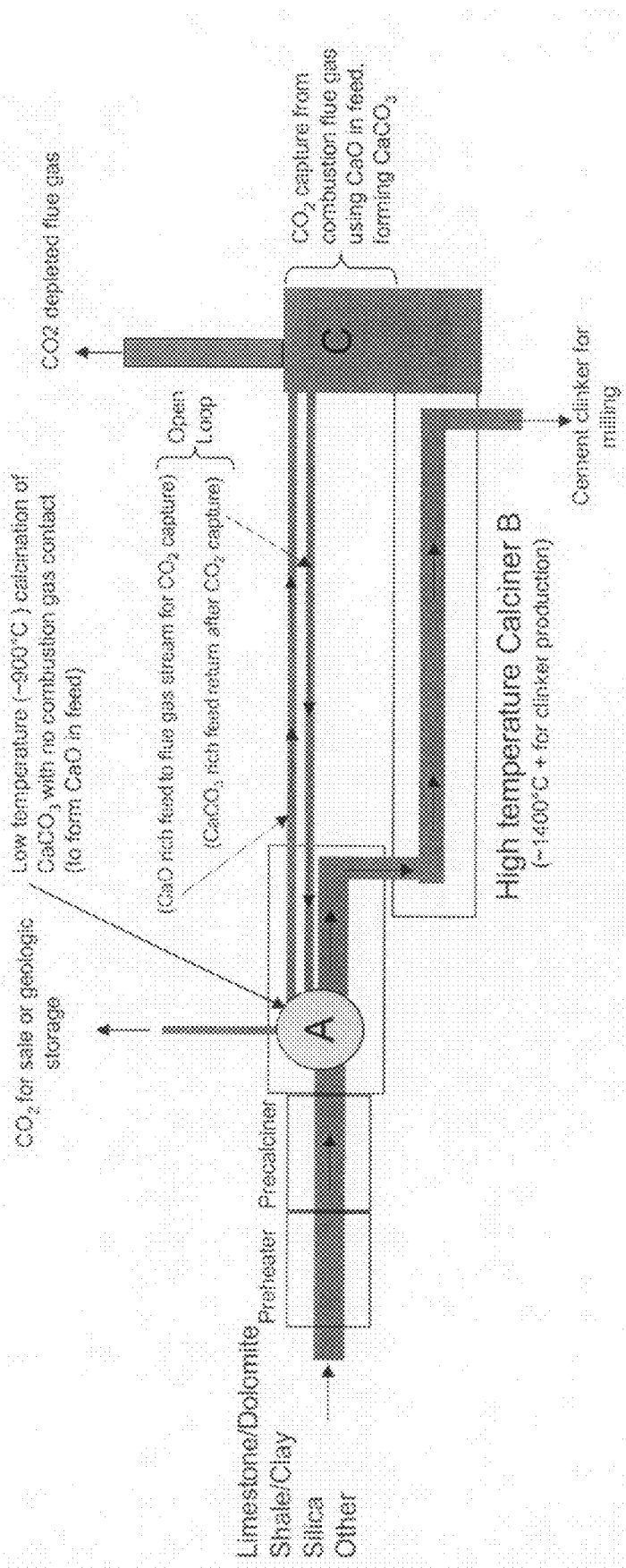
FIG. 3 is a schematic diagram illustrating an alternative embodiment of a cement manufacturing process according to the present invention utilizing $CO_2$ separation, capture, and maximization of hydrating phases within cement clinker.

As further seen in reference to FIG. 3, if the cement kiln feed cannot be broken into separate carbonate and alumina feeds, illustrates a process for separate $CO_2$ isolation designs where separate of carbonate and alumina cement kiln feeds is not possible. For instance, marl or highly interbedded limestone and shale deposits do not lend themselves to separation as seen in reference to FIG. 2. Accordingly, the process as described in reference to FIG. 3 provides additional design options.

As set forth in FIG. 2, the disclosed design has some significant process variable differences from those employed in a typical cement manufacturing process. As noted, the limestone/dolomite materials are separated from other raw materials prior to calcination. As a result, evolved $CO_2$ from the calcination of limestone and dolomite can be carried out. Additionally noted, is that the low temperature calcining of the carbonates releases $CO_2$ and forms CaO and MgO in a separate calciner (A) in which the atmosphere of the calcination process is not in contact with combustion gases, thereby resulting in the release of clean $CO_2$ which is not tainted with combustion gas. It is also noted that the CaO/MgO is combined with other raw materials just prior to the high temperature calcining step to form clinker. It is further noted that by controlling the addition points for CaO/MgO with respect to temperature within the high temperature calciner (B) allows the producer to maximize the formation of hydrating belites and alites and control the ratio of each in the final product. Accordingly, a cement manufacturer has better control of both early and late hydration strength and can minimize undesirable non-hydrating phases in the final product. A higher beta-belite ratio in the final product would also provide for greater late cure strength and lower energy consumption since lower formation temperatures may be employed.

For instance, the ratio of belite to alite can be controlled in the high temperature calciner (B) by controlling the calciner temperature and controlling the residence time. Belite forms at lower temperature conditions than alite and can be made more abundantly in the clinker if the temperatures in the calciner are held in the general range of 1000° C. to 1300° C. Alite is a higher temperature mineral and can be made more abundantly in the clinker if the calciner temperatures are at or above 1300° C.

By way of example, having the higher temperatures present at the entry point for the CaO than the formation temperature for gamma belite, one can greatly limit the amount of belite present in the end clinker. Similarly, if the calciner temperature is in the range of 1000° C. to 1300° C., there will be more belite. Clinker having a higher belite content in the final product may be made at a lower cost since the fuel costs for operating the calciner are less. Such clinker may be less reactive and slower to cure and is suitable for numerous commercial applications. Likewise, using a higher temperature or a series of higher temperature gradients in the clinker increases the production cost, but allows a clinker and the final milled cement from the clinker, to have higher reaction rates and cure times.

As seen in FIG. 3, when the carbonate and alumina kiln feeds cannot be separated, there are still opportunities to enhance the capture of clean $CO_2$ from the cement making process. As seen, the clinker feed of heated carbonate rich materials occurs in a temperature range of 650 to 1050° C. where $CaCO_3/CaMg(CO_3)_2$ decomposes to CaO/MgO. This is designed to occur in a no combustion gas contact calciner (A) resulting in the release of clean $CO_2$ that is not mixed with combustion gases. Additionally, the ability to use CaO/MgO rich clinker feed materials allows the operator to remove $CO_2$ from the combustion gases (C) with regeneration in the no combustion gas contact calciner (A), resulting in the release of additional clean $CO_2$.

As further seen in reference to FIGS. 2 and 3, the capture of $CO_2$ from combustion gases is enhanced by using CaO/MgO rich material that may be contacted with combustion gases (C) to form $CaCO_3$ or $CaMg(CO_3)_2$ and then returned to the low temperature calciner (A) for $CO_2$ stripping. The use of CaO/MgO as a capture material for $CO_2$ in an open loop system has advantages over closed loop known systems of CaO capture for $CO_2$. In an open loop system, the CaO/MgO is not recycled and therefore there is no loss of efficiency which would require replenishment of the CaO/MgO.

EXAMPLE 1

As seen in reference to FIG. 2, limestone/dolomite may be segregated from other components of clinker manufacturing and fed into a pre-heater and a precalciner segment during which time the limestone/dolomite undergoes drying and preheating to approximately 600° C. Thereafter, the heated limestone/dolomite is fed into the calciner (A) which raises the temperature of the feed to approximately 1050° C. for discharge to the remaining portion of the cement making process. Between 600° C. and 1050° C. the majority of the limestone/dolomite ($CaCO_3/CaMg(CO_3)_2$) decomposes to CaO/MgO with a release of $CO_2$, which is captured and removed from calciner (A) prior to discharge to the high temperature calciner (B). As illustrated in FIG. 2, a fraction of the CaO/MgO maybe conveyed in an open loop manner to a separate location for interaction with combustion flue gas forming $CaCO_3/CaMgCO_3$ at location (C) which is then returned to the calciner (A) for subsequent stripping of $CO_2$. From the calciner (A), $CO_2$ may be collected for sale or geologic storage, the $CO_2$ being of high purity since in the calciner (A) no combustion gases are allowed to interact with the limestone/dolomite, and its reaction products. The CaO/MgO rich feed from the calciner (A) may be added at various temperature zones, as seen by the directional arrows, or held at various temperatures and retention times in the high temperature calciner (B) to maximize the formation of various hydrating phases (belite and alite) to yield various types of cement clinker. Belite is responsible for late strength in cement because of its slower reaction rate in water. Alite is responsible for early strength due to its high reaction rate in water. Cement with a higher belite to alite ratio would tend to cure more slowly, develop fewer cracks from thermal expansion, and would require less energy to manufacture. Cement with a higher alite to belite ratio would cure quicker, expand more during curing, and develop more thermal cracks. Cement with a high alite to belite ratio would be useful where quick curing and early strength is desired.

EXAMPLE 2

As seen in reference to FIG. 3, a process may be provided in which the clinker constituents cannot be easily separated into a separate limestone/dolomite phase. In this scenario, the pre-heater and pre-calciner are operated at temperatures similar to those described in reference to Example 1. The calciner (A) provides for no combustion gas contact with the material feed such that the $CO_2$ evolved in the calciner is of a sufficiently clean form that it may be captured for sale and/or geologic storage. A portion of the CaO/MgO which is produced in calciner (A) is used to scrub the combustion flue gas at location (C) from the clinker production so as to remove $CO_2$ from the flue gas, thereby forming $CaCO_3/CaMg(CO_3)_2$. The $CaCO_3/CaMg(CO_3)_2$ feed is thereafter introduced into the calciner (A) resulting in the release of a clean supply of $CO_2$ in an open loop process. As the feed materials move through calciner (A), they are removed at the end of the calciner unit and subjected to a higher temperature in calciner (B) of approximately 1400° C. or higher and are in contact at this step with combustion flue gas. Upon sintering of materials to form clinker the cooled clinker is milled to form cement.

Although preferred embodiments of the invention have been described using specific terms, devices, methods, and Figures, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process for the production of cement clinker which comprises the steps of:
   heating the limestone/dolomite components of the a clinker feed in a first calciner at a temperature of between about 650° C. to about 1050° C., said calciner containing no combustion gases;
   removing a portion of a CaO/MgO reaction product from said calciner;
   using said removed CaO/MgO to capture $CO_2$ from fuel combustion flue gas associated with said cement production process, thereby generating a supply of $CaCO_3/CaMg(CO_3)_2$;
   introducing said supply of $CaCO_3/CaMg(CO_3)_2$ from said flue gas environment into said first calciner, said $CaCO_3/CaMg(CO_3)_2$ thereby releasing $CO_2$;
   removing released $CO_2$ from said calciner; and,
   removing additional reaction products from said calciner and subsequently exposing said reaction products in a second calciner to a temperature of between about 1300° C. to about 1450° C. until clinker is formed.

2. The process according to claim 1 wherein prior to said step of heating said limestone/dolomite components of a clinker feed, said limestone/dolomite components are separated from other constituents of said clinker feed.

3. The process according to claim 1 wherein said heating in said first calciner of the limestone/dolomite components of a clinker feed is performed in an environment free of combustion gases.

4. The process according to claim 1 wherein carbonate oxides are added to said second calciner, a temperature and a residence time of said carbonate oxides within said second calciner affecting a yield and a ratio of belite to alite within the clinker feed.

* * * * *